Feb. 23, 1954 G. ZUCCOLI 2,669,779
MEANS FOR MOUNTING ARTIFICIAL MOLAR TEETH
Filed Oct. 20, 1951 2 Sheets-Sheet 1
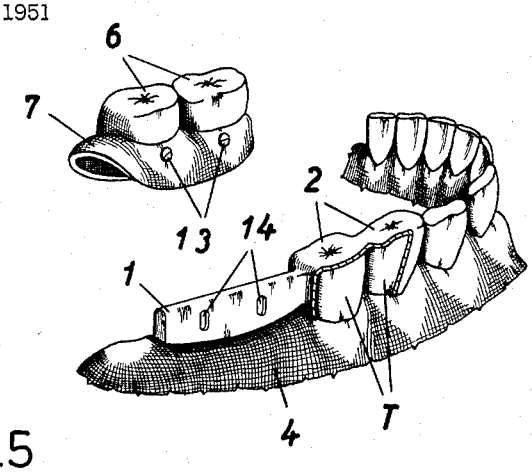
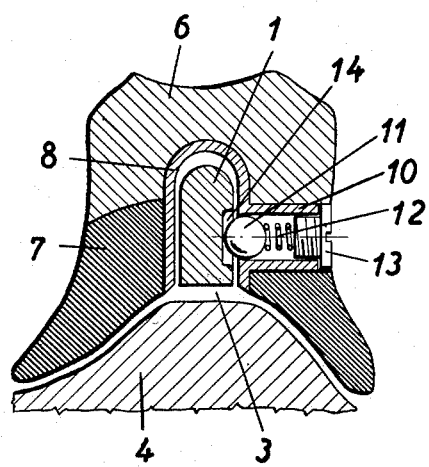
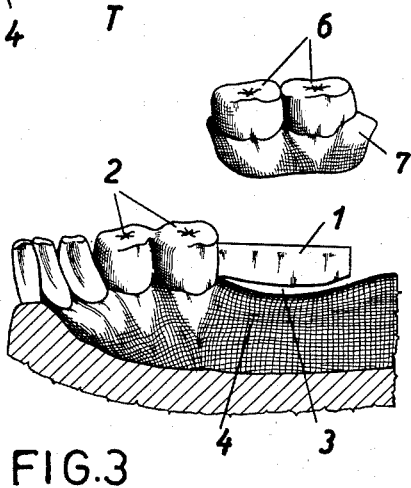
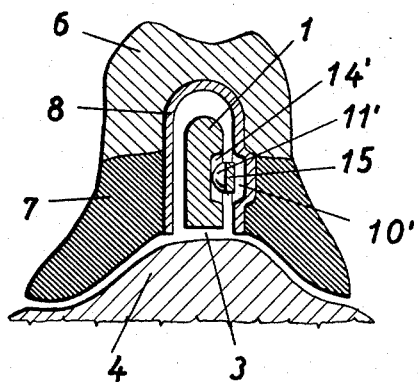
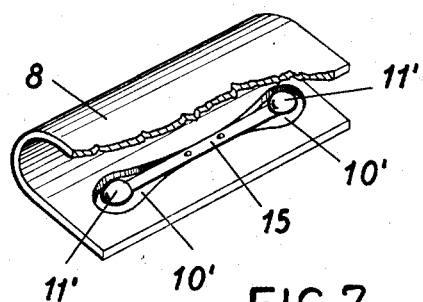

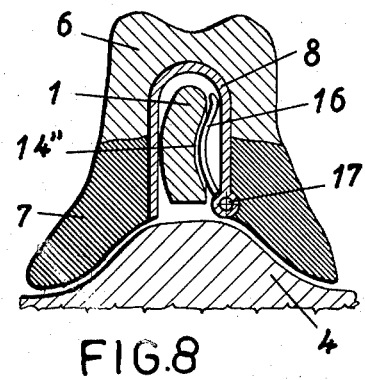
FIG.8
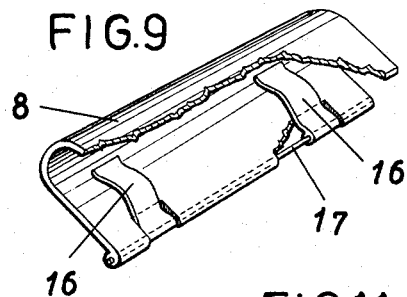
FIG.9
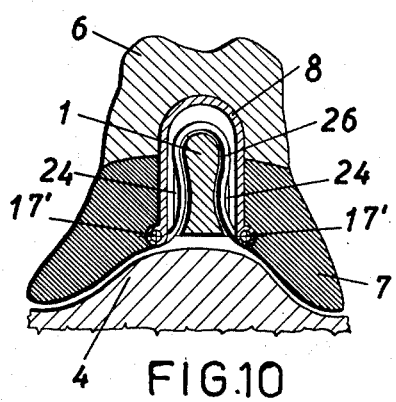
FIG.10
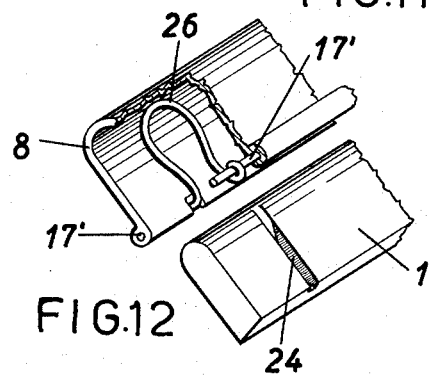
FIG.11
FIG.12
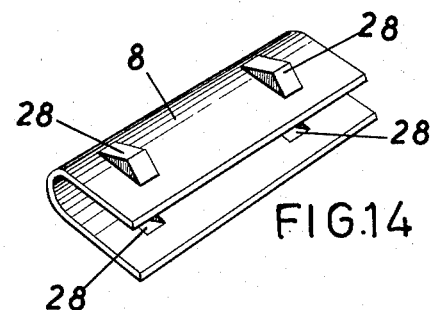
FIG.14
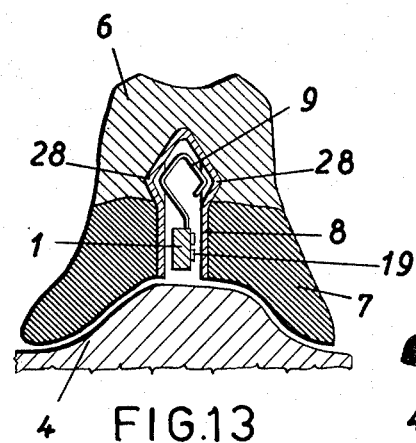
FIG.13
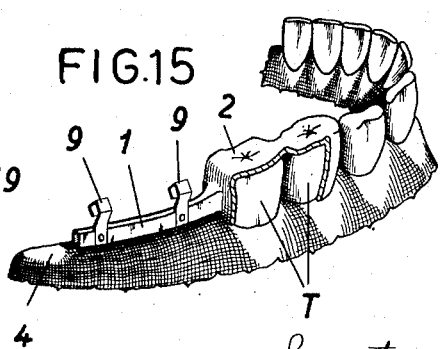
FIG.15

Patented Feb. 23, 1954

2,669,779

UNITED STATES PATENT OFFICE 2,669,779

MEANS FOR MOUNTING ARTIFICIAL MOLAR TEETH

Guido Zuccoli, Florence, Italy

Application October 20, 1951, Serial No. 252,303

7 Claims. (Cl. 32—5)

This invention relates to the means for mounting artificial molar teeth by means of existing teeth and aims to provide an improved device for dismountably holding one or a plurality of the artificial molar teeth by means of the last remaining natural teeth without need of fastening same also to the teeth of the opposite half of the jaw by means of a supporting bridge-like piece traversing the mouth.

This is attained by fastening by usual means (metal crowns or the like) to the last existing tooth or teeth of the set a projecting bracket-like bar which runs parallel to the gum without coming into contact therewith and by clasping thereon the artificial teeth. Each tooth is previously fastened to a gum simulating base having a saddle-like insert by such resilient means as to permit the lower surface of the base proper to remain clear of the gum, but to bear against the upper surface of the edentulous gums under the chewing pressure, thus avoiding to transmit excessively high strains to the natural teeth to which the bracket bar is fastened.

The invention will be better understood from the following specification by reference to the accompanying drawings, in which:

Figure 1 is a perspective outside view of part of a set of teeth showing how a bracket-like artificial-teeth-supporting bar is fastened to the last natural teeth of the set;

Figure 2 is a perspective view of the artificial back teeth fitted on a base adapted to be fastened to the bracket bar shown in Figure 1;

Figures 3 and 4 are inside views of the parts shown in Figures 1 and 2, respectively;

Figure 5 is a cross section through one of the artificial back teeth fitted on the bracket bar;

Figures 6 and 7 show in cross section and in perspective view, respectively, a further embodiment of means for fastening the artificial molar teeth to a bracket-like bar;

Figures 8 and 9 respectively shown in a cross section and in perspective view, two further embodiments of the invention;

Figure 10 shows in cross section and Figures 11 and 12 in perspective views a further embodiment of the invention, and Figures 13, 14 and 15 show a cross section and two perspective views of a further modification of the device according to the invention.

Referring particularly to Figures 1 to 5, the device according to the invention comprises a bracket bar 1 fastened by suitable means, as metallic caps or crowns 2 to the natural molar teeth T. Bracket 1 does not touch the edentulous gum 4 to which it runs parallel leaving a clearance 3. The artificial back teeth 6 are fastened on to a base 7 having its lower surface recessed to snugly fit on the upper part of a gum 4 while its side surfaces are made so as to simulate a gum. The base 7 is provided in its middle longitudinal part with a hollow saddle-like metallic insert 8 (Fig. 5) fitting snugly on bracket 1 to which it is fastened with little play by spring means which will be described presently. The fastening is however such as to permit of artificial tooth base 7 being able to effect little movements particularly towards or away from gums 4.

The spring means which serve for fastening the artificial molar teeth 6 integral of base 7 to the bracket bar 1 may be constructed in a variety of ways, as will be seen from the following examples:

According to the embodiment shown in Figures 1 through 5, the bracket 1, which is in the form of a flat bar, with its larger side disposed in a vertical plane, is provided with a pair of vertical grooves or notches 14, while the base 7 carrying the artificial teeth 6 is provided with corresponding transversal bores provided with linings 10 and opening into a smaller bore drilled through insert 8 in correspondence of grooves 14. Into said bores 10 a ball 11 is introduced, whose diameter is a little smaller than bore 10, but larger than the bore drilled through insert 8. This ball is pushed towards the inside of base 7 by a spring 12 bearing against screw 13 screwed into an outer threaded portion of the metallic lining 10. It is apparent that when the saddle-like insert 8 of base 7 is pushed into bracket 1, balls 11 snap into the corresponding notches 14 of said bracket 1 and hold said insert 8 and attached base 7 and artificial teeth 6 firmly anchored to bracket 1, although, due to the elongated shape of notches 14 little movements towards or away from the gums of base 7 are permitted.

In the embodiment shown in Figures 6 and 7 the saddle-shaped insert 8 presents on one side an in-pressed portion 10' to which a leaf spring 15 is fastened carrying at each end a round bulge 11' adapted to snap into corresponding notches 14' of bracket 1, as shown in Figure 6.

In the embodiment shown in Figures 8 and 9, the saddle-like insert 8 is provided at one side with a longitudinal pin 17 to which a pair of curved leaf springs 16 are hinged, projecting inside of the said saddle 8 in correspondence of notches 14" provided in bracket 1.

In the embodiment shown in Figures 10 through 12 the insert 8 is provided at its longitudinal ends with a pair of pins 17' to which a pair of loops 26 made of spring wire or ribbon are hinged, so as to snap into corresponding grooves 24 provided on the bracket 1, when the insert 8 is pressed on bar 1.

Last, in the embodiment shown in Figures 13 through 15 to the bracket 1 vertical spring loops 9 made of steel wire or ribbon are fastened, as by screws 19. The saddle-like insert 8 is provided with impressions 28 into which the spring loops 9 may snap as shown in Figure 13.

From the foregoing, it is apparent that the invention provides a means permitting of fastening artificial molar teeth to a projecting bracket-like supporting means, without subjecting the natural teeth to which the bracket is attached to undue stresses. In fact the attachment is such that the artificial teeth are simply supported by the bracket bar and the lower part of the base does not contact with the gums when it is not pushed towards the underlying gums by a substantial pressure, as it happens when the artificial teeth are used for chewing. In this case their base is permitted to be shifted towards the gums, which thus act as temporary bearing, resisting the pressure exerted upon the artificial teeth. When the chewing pressure ceases, the base is shifted away from the gums, due to the springiness of the clasps and of the gums. The base together with the artificial teeth may be easily snapped off if necessary, for cleaning or repairs.

I claim:

1. In dental prosthesis, a device for mounting artificial molar teeth in the mouth, comprising a bracket-like bar, means adjacent one end of said bar for attaching it to the natural molar teeth and holding it parallel to and spaced from the edentulous portion of the gums when the prosthesis is mounted in the mouth, a base carrying the artificial molar teeth comprising a gum simulating portion with teeth thereon, said gum simulating base being made at its lower part with a recessed portion to fit snugly above the edentulous gum, a saddle-like metallic insert in said base, said insert having a hollow part fitting with some play above said bracket-like bar, and coacting resilient locking means between said bracket bar and the insert for fastening said artificial tooth holding base to said bracket bar and for holding it substantially out of contact with the gums when the artificial teeth are not pressed towards the gums and permitting shifting of the lower hollow part of said base into contact with the gums when chewing pressure is exercised on said artificial teeth.

2. In dental prosthesis, a device for mounting artificial molar teeth in the mouth, comprising a bracket-like substantially flat rectangular shaped bar, means adjacent one end of said bar for attaching it to the natural molar teeth, said bar held with its larger sides in a vertical position and its lower surface parallel to and spaced from the edentulous portion of the gums, a pair of notches located vertically in said larger sides, an artificial tooth holding base comprising a gum-like portion having a recessed portion formed in its lower surface to fit on the edentulous portion of the gums, a saddle-like metal insert fitted in said base and fitting snugly on said bracket-like flat bar, and spring pressed means projecting inside of said saddle-like insert towards the notches of said bracket-like bar so as to resiliently clasp said artificial tooth holding base to said bar while permitting slight vertical shifting of said base.

3. In dental prosthesis, a device according to claim 2, including bores located transversely of the tooth base, smaller bores located in said metallic insert in alignment with said tooth base bores so that when said insert is fitted on the bracket bar, each of said smaller metal insert bores comes into alignment with one of said notches of the bracket bar, each tooth base bore having a ball therein of a diameter slightly less than that of said bore and slightly greater than that of the metallic inset bore, a spring inserted behind said ball, and a screw threaded into said tooth base bore to press the spring against the ball so as to push a part of said ball outside of said insert bore and into engagement with one of the notches of said bracket bar.

4. In dental prosthesis, a device as claimed in claim 2, including a leaf spring terminating with rounded bulges and fastened adjacent its center in a hollow of said saddle-like insert, whereby said bulges are so fitted as to come into engagement with said notches of said bracket bar when said insert is pushed into clamping engagement on said bracket bar.

5. In dental prosthesis, a device as claimed in claim 2, including a pin carried in at least one of the longitudinal sides of said saddle-like insert, and at least one spring leaf attached to said pin to project inside of said saddle-like member, to engage a corresponding groove of said bracket bar and clamp said insert to said bar.

6. In dental prosthesis, a device as claimed in claim 1, including vertically extending spring wire clasps each terminating with a loop and carried at its free end on said bracket bar, while said saddle-like insert is provided with in-pressed hollows into which the said spring loops snap when said artificial tooth holding base is fitted on said bracket bar.

7. In dental prosthesis, a device for mounting artificial molar teeth in the mouth, comprising a bracket-like bar, means adjacent one end of said bar for attaching it to the natural molar teeth and holding it parallel to and spaced from the edentulous portion of the gums, a base carrying the artificial molar teeth comprising a gum simulating portion with teeth thereon, said gum simulating base being made at its lower part with a recessed portion to fit snugly above the edentulous gum, a saddle-like metallic insert in said base, said insert having a hollow part fitting with some play above said bracket-like bar, spring loop clamping elements projecting upwardly from said bar, and impressions formed inside of said base and said saddle-like insert for resilient engagement by said clamping elements to hold said artificial teeth anchored to said bar, while permitting small vertical shiftings of said clamping elements in said impressions to allow said base to bear against the gums when said artificial teeth are subjected to substantial chewing pressure.

GUIDO ZUCCOLI.

References Cited in the file of this patent

UNITED STATES PATENTS

| Number | Name | Date |
| --- | --- | --- |
| 1,116,371 | Bennett | Nov. 10, 1914 |
| 1,302,499 | Bennett | May 6, 1919 |
| 1,324,476 | Supplee | Dec. 9, 1919 |
| 2,593,287 | Fiorentini | Apr. 15, 1952 |
| 2,605,546 | Darcissac | Aug. 5, 1952 |

FOREIGN PATENTS

| Number | Country | Date |
| --- | --- | --- |
| 722,845 | France | Jan. 5, 1932 |